United States Patent
Yuan et al.

(10) Patent No.: US 10,124,633 B2
(45) Date of Patent: Nov. 13, 2018

(54) PATCH-TYPE PASSIVE SURFACE ACOUSTIC WAVE SENSING DEVICE AND INTELLIGENT TIRE

(71) Applicant: MESNAC Co., Ltd, Qingdao, Shandong (CN)

(72) Inventors: Zhongxue Yuan, Shandong (CN); Jiangjia Zheng, Shandong (CN); Lanfei Dong, Shandong (CN); Jiangbo Wei, Shandong (CN); Xuezhi Teng, Shandong (CN); Haijun Chen, Shandong (CN); Peifeng Sun, Shandong (CN)

(73) Assignee: MESNAC Co., Ltd., Qingdao, Shandong (CN)

( * ) Notice: Subject to any disclaimer, the term of this patent is extended or adjusted under 35 U.S.C. 154(b) by 36 days.

(21) Appl. No.: 15/512,118

(22) PCT Filed: Jun. 10, 2015

(86) PCT No.: PCT/CN2015/081128
§ 371 (c)(1),
(2) Date: Jun. 12, 2017

(87) PCT Pub. No.: WO2016/045412
PCT Pub. Date: Mar. 31, 2016

(65) Prior Publication Data
US 2017/0274713 A1    Sep. 28, 2017

(30) Foreign Application Priority Data

Sep. 23, 2014 (CN) .......................... 2014 1 0487283

(51) Int. Cl.
*B60C 23/02* (2006.01)
*B60C 23/04* (2006.01)
(Continued)

(52) U.S. Cl.
CPC .......... *B60C 23/0449* (2013.01); *B60C 23/00* (2013.01); *B60C 23/02* (2013.01);
(Continued)

(58) Field of Classification Search
None
See application file for complete search history.

(56) References Cited

U.S. PATENT DOCUMENTS

| 6,539,295 | B1 * | 3/2003 | Katzen | .................. B60C 23/064 |
| | | | | 701/33.6 |
| 2008/0168833 | A1 * | 7/2008 | Awad | .................... G01M 17/02 |
| | | | | 73/146 |

(Continued)

FOREIGN PATENT DOCUMENTS

| CN | 2238157 Y | 10/1996 |
| CN | 101041318 A | 9/2007 |

(Continued)

OTHER PUBLICATIONS

International Search Report dated Aug. 26, 2015, for corresponding International Patent Application No. PCT/CN2015/081128.

*Primary Examiner* — Andre Allen
(74) *Attorney, Agent, or Firm* — Morgan, Lewis & Bockius LLP

(57) ABSTRACT

A patch-type passive acoustic waving sensing device includes a surface acoustic wave sensor and at least a first and second rubber sheets. A cross-section of each of the first and second rubber sheets is larger than that of the surface acoustic wave sensor. A bottom of the surface acoustic wave sensor is on an upper surface of the first rubber sheet, and a first central hole allowing the surface acoustic wave sensor to penetrate therethrough is formed in a center of the second rubber sheet. The surface acoustic wave sensor penetrates the first central hole, and the second rubber sheet is fixedly connected to the upper surface of the first rubber sheet. The
(Continued)

surface acoustic wave sensor includes pins at the bottom thereof such that free ends of the pins are connected to an antenna, and the antenna and some of the pins are inside the first rubber sheet.

10 Claims, 2 Drawing Sheets

(51) Int. Cl.
    *B60C 23/00*     (2006.01)
    *B60C 23/20*     (2006.01)
    *G01L 9/00*     (2006.01)
    *G01K 11/26*     (2006.01)

(52) U.S. Cl.
    CPC .......... *B60C 23/04* (2013.01); *B60C 23/0408* (2013.01); *B60C 23/0452* (2013.01); *B60C 23/0493* (2013.01); *B60C 23/20* (2013.01); *G01K 11/265* (2013.01); *G01L 9/00* (2013.01); *G01L 9/0025* (2013.01)

(56) References Cited

U.S. PATENT DOCUMENTS

| | | | |
|---|---|---|---|
| 2009/0069969 A1* | 3/2009 | Hammerschmidt | B60C 23/064 701/31.4 |
| 2013/0081457 A1* | 4/2013 | Wilson | G01M 17/02 73/146 |
| 2016/0129737 A1* | 5/2016 | Singh | B60C 23/0488 73/146.3 |

FOREIGN PATENT DOCUMENTS

| | | |
|---|---|---|
| CN | 102896987 A | 1/2013 |
| CN | 203460629 U | 3/2014 |
| CN | 103738127 A | 4/2014 |
| DE | 10 2010 014 803 A1 | 10/2011 |
| JP | 2007-137037 A | 6/2007 |
| KR | 10-2013-0065007 A | 6/2013 |

* cited by examiner

PATCH-TYPE PASSIVE SURFACE ACOUSTIC WAVE SENSING DEVICE AND INTELLIGENT TIRE

FIELD OF THE TECHNOLOGY

The present invention relates to a passive surface acoustic wave sensing device, and more specifically, relates to a patch-type passive surface acoustic wave sensing device and an intelligent tire.

BACKGROUND OF THE INVENTION

Served as an advance warning system, the 'tire pressure monitoring system (TPMS)' provides not only a protection by sensing the pressure and temperature of tire in real time to effectively avoid tire explosion, but also a way to reduce oil consumption, improve the overall performance and service life of vehicles, and therefore, with features of high economic benefits and being environment-friendly.

The tire pressure sensor is an important sensing element of the tire pressure monitoring system. At present, it is commonly seen that an active type of the tire pressure sensor on sale, in which a pressure sensor, a power supply, a MCU and a wireless communication module are packaged, and then the active pressure sensor is arranged on tire valve or on wheel hub. Due to the fact of relying on power supply, the active type of the tire pressure sensor is large in size, and the battery of that requires to be replaced periodically. Hence, the active tire pressure sensor is inconvenient and not environment-friendly. Additionally, the pressure sensor on tire valve or on wheel hub is not in contact with the tire directly, and hence, the temperature monitored by the sensor is the air temperature inside the tire rather than the real-time temperature of the tire. The monitor of temperature by the sensor on tire valve or on wheel hub is indirect and not in real time. Further, the arrangement of putting the sensor on tire valve or around improves the risk of damaging the tire valve or sending module, and further causes the failure of the tire pressure monitoring system.

SUMMARY OF THE INVENTION

To solve kinds of technical problems of the active pressure sensor of the prior art, the present invention provides a passive surface wave sensor device.

To solve the above-mentioned technical problem, the present invention adopts the following technical solution:

A patch-type passive surface acoustic wave sensing device, comprises a surface acoustic wave sensor, and at least a first rubber sheet and a second rubber sheet, the cross section of the first rubber sheet and the cross section of the second rubber sheet is larger than the cross section of the surface acoustic wave sensor, the bottom of the surface acoustic wave sensor is fixedly disposed on the upper surface of the first rubber sheet, the center of the second rubber sheet is opened with a first central hole through which the surface acoustic wave sensor penetrates, the second rubber sheet is fixedly connected to the upper surface of the first rubber sheet, the surface acoustic wave sensor comprises pins on the bottom part, free ends of the pins are connected to an antenna, the antenna and part of the pin are arranged inside the first rubber sheet.

Furthermore, in order to provide a comparatively plane support for the surface acoustic wave sensor, a PCB is fixedly arranged between the surface acoustic wave sensor and the first rubber sheet, the PCB board is opened with through holes corresponding to the pins, the pins penetrates through the through holes to connect with the antenna. The PCB has features of high temperature resistance and high pressure resistance, and therefore, the support to the surface acoustic wave sensor provided by the PCB could prevent the first rubber sheet from moving.

Furthermore, a third rubber sheet is fixedly disposed on the upper surface of the second rubber sheet, the center of the third rubber sheet is opened with a second central hole through which the surface acoustic wave sensor penetrates, the surface acoustic wave penetrates the second central hole. The third rubber sheet could improve the thickness of rubber around the surface acoustic wave sensor and form a smooth transition from the top of the surface acoustic wave sensor, the first rubber sheet, the second rubber sheet and the third rubber sheet.

Furthermore, a shell is arranged outside the surface acoustic wave sensor in a sealed way, and the pins extend out from the shell.

In order to eliminate the negative impact on the accuracy of the surface acoustic wave sensor due to the fact that the surface acoustic wave sensor is being pushed by the rubber sheets around, the diameter of the first central hole and the diameter of the second central hole is larger than the outer diameter of the surface acoustic wave sensor.

Preferred, the gap between the inner wall of the first central hole and the surface acoustic wave sensor, and the gap between the inner wall of the second central hole and the surface acoustic wave sensor are being arranged not less than 0.1 cm.

Preferred, the first rubber sheet, the second rubber sheet, the third rubber sheet and the passive surface acoustic wave sensing device arranged in are put in a mould to shape by vulcanization.

Furthermore, two pins are provided and the antenna connected with the pin is a spring antenna or a steel wire dipole antenna.

Based on the above-mentioned patch-type passive surface acoustic wave sensing device, the present invention also provides an intelligent tire, the intelligent tire comprises a patch-type passive surface acoustic wave sensing device according to any one of claim 1 to claim 8, the patch-type passive surface acoustic wave sensing device is fixedly arranged on the inner wall of the tire.

Furthermore, the patch-type passive surface acoustic wave sensing device is fixed to the tire with cold vulcanization glue.

In comparison with the prior arts, the advantages and advantageous effects are: the patch-type passive surface acoustic wave sensing device provided by the present invention uses a passive surface acoustic wave sensor to detect parameters as pressure and temperature, and therefore, a series problems caused by active surface acoustic wave sensing device could be solved, and hence it could be widely used in areas where battery could not be replaced conveniently, such as the inner side of tire or inside a sealed device. The passive surface acoustic wave sensing device can be directly arranged on the inner surface of the tire and contact with the tire body directly, so tire temperature could be detected in real time. Additionally, the patch-type design of the passive surface acoustic wave sensing device enables it could be fixed on the inner wall of the tire by vulcanization under low temperature and pressure, or just glued with the inner surface of tire, so as to avoid using the way to fix the existing sensing device in the process of tire vulcanization during which the sensing device fixed on the inner surface of tire has to endure high temperature and high pressure with tire body. The vulcanization temperature and the pressure inside vulcanization tank are comparatively high during the vulcanization of tire body, which probably leads to the damage of surface acoustic wave sensor under this circumstance.

With the detailed description of embodiments of the present invention in conjunction with the figures, other characters and advantages of the present invention can be clearer.

BRIEF DESCRIPTION OF THE DRAWINGS

In order to clearly describe the embodiments of the present invention or the technical solutions in the prior arts, the drawings which are needed for the description of the embodiments and the prior arts are briefly described as follows. Obviously, the drawings of the below descriptions are merely embodiments of the present invention. To the persons skilled in the art, other drawings can be obtained in accordance with these drawings without further creative efforts.

DETAILED EMBODIMENT OF THE INVENTION

Figure 1:
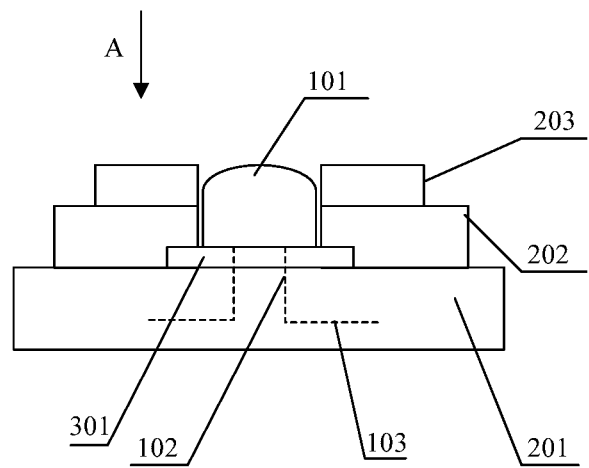
FIG. 1 is the structural schematic diagram of an embodiment of the patch-type passive surface acoustic wave sensing device provided by the present invention.

In conjunction with the figures in the present invention's embodiments, technical solutions of the present invention's embodiments are clearly and completely described as follows. Obviously, said embodiments are not all embodiments but merely a portion of the embodiments of the present invention. Based on the embodiments in the present invention, other embodiments derived by the persons skilled in the art without further creative efforts are within the protection scope of the present invention.

Embodiment 1 provides a patch-type passive surface acoustic wave sensing device. As illustrated in the FIG. 1, wherein comprises a surface acoustic wave sensor 101, and at least a first rubber sheet 201 and a second rubber sheet 202. The cross section of the first rubber sheet 201 and the cross section of the second rubber sheet 202 are respectively larger than that of the surface acoustic wave sensor 101. The bottom of the surface acoustic wave sensor 101 is fixedly arranged on the upper surface of the first rubber sheet 201. As illustrated in the FIG. 2 is the A-A view of the FIG. 1, the center of the second rubber sheet 202 is opened with a first central hole 204 through which the surface acoustic wave sensor 101 penetrates. The surface acoustic wave sensor 101 penetrates through the first central hole 204, and the second rubber sheet 202 is fixedly connected with the upper surface of the first rubber sheet 201. The surface acoustic wave sensor 101 comprises pins 102 on the bottom part, and a free end of the pin 102 is connected to an antenna 103, and the antenna 103 and part of the pins 102 are arranged inside the rubber sheet 201. In the passive surface acoustic wave sending device of the embodiment, the surface acoustic wave senor 101 is fixed by the first rubber sheet, and the second rubber sheet is being used together to support and protect the outer of the surface acoustic wave sensor 101, the pressure sensing point on the top of the surface acoustic wave sensor 101 is being disposed to expose to outside to form a SMT structure as a whole. The installation of the device could be achieved by merely fixing the first rubber sheet 201 on the target area.

The passive surface acoustic wave sensing device is a passive sensing device relying on surface acoustic wave sensing technology. Request signals are sent from the outside, and in the meanwhile changes emerge in the feedback signals responding to the request signals due to that the parameters and nature of surface acoustic wave are changed with different temperature or pressure of environment. The feedback signals are being analyzed from the outside to obtain the information of temperature or pressure and the like. The patch-type passive surface acoustic wave sensing device can be widely used in environment being inconvenient to change battery (such as the sealed inside of a tire or a tank trucker), and particularly friendly in use and also solves the series of problems caused by the active device. The overall is designed as a SMT structure, and therefore the installation of the device could be achieved by merely fixing the first rubber sheet 201 on the target area, the ways for fixing could be using glue or using vulcanization under low pressure and low temperature, to compound the rubber sheet and the target area as a whole. Hence, the damage caused by existing method for fixing the acoustic wave sensor under harsh conditions with high temperature and high pressure is avoided.

As a preferred embodiment, in order to prevent the movement of the first rubber sheet caused by vulcanization under low temperature and pressure, a comparatively even support plane should be provided for the surface acoustic wave sensor. As shown in the FIG. 1, a PCB 301 is fixedly provided between the surface acoustic wave sensor 101 and the first rubber sheet 201, the PCB 301 is opened with through holes corresponding to the pins 102, the pins 102 penetrate through the through holes to connect to the antenna 103. The PCB 301 has features of high temperature resistance and high pressure resistance. The way of using the PCB 301 to support the surface acoustic wave sensor 101 provides a method to solve the problem that the surface acoustic wave sensor could not be properly supported if the first rubber sheet is moved caused by vulcanization. Of course, the PCB is not limited in the embodiment, other types of hard boards with high temperature resistance and high pressure resistance also could be used.

Figure 2:
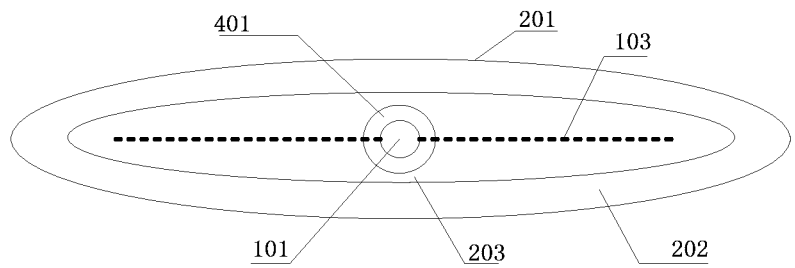
FIG. 2 is the A-A view of the FIG. 1.

As illustrated in the FIG. 1, a third rubber sheet 203 is fixedly disposed on the upper surface of the second rubber sheet 202, the center of the third rubber sheet 203 is opened with a second through hole through which the surface acoustic wave sensor 101 penetrates. The surface acoustic wave sensor 101 penetrates through the second through hole. The third rubber sheet 301 is added to improve the thickness of the rubber around the surface acoustic wave sensor, and form a smooth transition from the top of the surface acoustic wave sensor 101 to the third rubber sheet 203, to the second rubber sheet 202, and then to the first rubber sheet 201.

Figure 3:
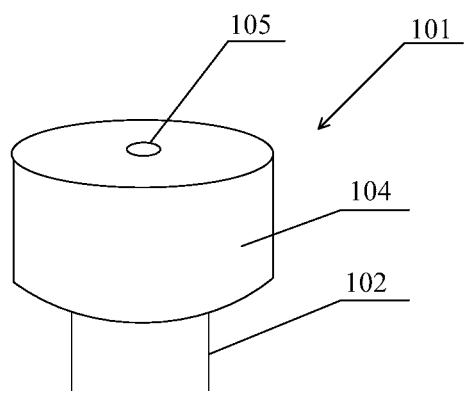
FIG. 3 is the schematic diagram of the outer structure of the surface acoustic wave sensing device.

In order to protect the inner structure of the sensor, as illustrated in the FIG. 3, a shell 104 is arranged to seal the outside the surface acoustic wave sensor 101, and the pins 102 extends out from the shell 104. The top of the surface acoustic wave sensor 101 is the pressure sensing point 105 to sense the temperature or pressure outside.

In order to eliminate the negative impact on the accuracy of the surface acoustic wave sensor due to the fact that the surface acoustic wave sensor is being pushed by the rubber sheets around, the diameter of the first central hole and the diameter of the second central hole is larger than the outer diameter of the surface acoustic wave sensor.

Preferred, the gap 401 between the inner wall of the first central hole and the surface acoustic wave sensor, and the inner wall of the second central hole and the surface acoustic wave sensor are being arranged not less than 0.1 cm to prevent the rubber sheets from being too close to the surface acoustic wave sensor to bring in extra additional pressure and reduce the accuracy.

Relying on the good features of being not sticky or fragile, vulcanization are preferably used in shaping the first rubber sheet 201, the second rubber sheet 202 and the third rubber sheet 203.

The passive surface acoustic wave sensor has two pins 102 in the present embodiment, the antenna 103 connected to the pins could be spring antenna and steel wire dipole antenna.

Figure 4:
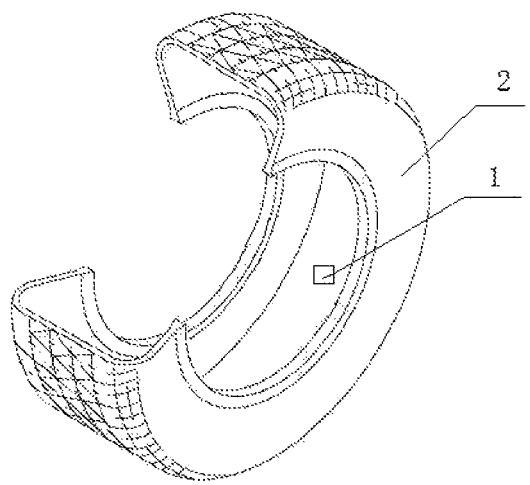
FIG. 4 is the structural schematic diagram of an embodiment of the intelligent tire.

Embodiment 2, based on the patch-type passive surface acoustic wave sensing device disclosed in the embodiment 1, the prevent embodiment provides an intelligent tire. The intelligent tire comprises the patch-type passive surface acoustic wave sensing device. As illustrated in the FIG. 4, the patch-type passive surface acoustic wave sensing device is fixed on the inner wall of the tire 2. Of course, the patch-type passive surface acoustic wave sensing device also could be fixed on the side surface of the inner wall of the tire, namely at the surrounding area of rim on the inner side of the tire.

As a preferred embodiment, the patch-type passive surface acoustic wave sensing device 1 is fixedly connected to the tire 2 with cold vulcanization glue.

The intelligent tire disclosed in the present embodiment, the sensing device arranged inside does not rely on battery to maintain its work. Compared with the active one, it has the advantages of being small in size and light in weight, and also has features of good temperature resistance and pressure resistance, and therefore there is no impact exerted by the high temperature of tire during driving on the sensor. Additionally, the density for collecting the pressure signal and the temperature signal is high, the speed for processing signal is fast, and therefore the goal for monitoring the temperature and pressure of tire could be achieved.

Certainly, the above description does not constitute limitations of the present invention, and the present invention shall not be limited to the above embodiments. The person skilled in the art can make changes, adjustments, additions, and replacements based on the substantive scope of the present invention, and those contents also belong to the protection scope of the present invention.

The invention claimed is:

1. A patch-type passive surface acoustic wave sensing device, comprising a surface acoustic wave sensor, and at least a first rubber sheet and a second rubber sheet, the cross section of the first rubber sheet and the cross section of the second rubber sheet is larger than the cross section of the surface acoustic wave sensor, the bottom of the surface acoustic wave sensor is fixedly disposed on the upper surface of the first rubber sheet, the center of the second rubber sheet is opened with a first central hole through which the surface acoustic wave sensor penetrates, the second rubber sheet is fixedly connected to the upper surface of the first rubber sheet, the surface acoustic wave sensor comprises pins on the bottom part, free ends of the pins are connected to an antenna, the antenna and part of the pins are arranged inside the first rubber sheet.

2. The patch-type passive surface acoustic wave sensing device according to claim 1, wherein a PCB is fixedly arranged between the surface acoustic wave sensor and the first rubber sheet, the PCB is opened with through holes corresponding to the pins, the pins penetrates through the through holes to connect to the antenna.

3. The patch-type passive surface acoustic wave sensing device according to claim 1, wherein a third rubber sheet is fixedly disposed on the upper surface of the second rubber sheet, the center of the third rubber sheet is opened with a second central hole through which the surface acoustic wave sensor penetrates, the surface acoustic wave penetrates the second central hole.

4. The patch-type passive surface acoustic wave sensing device according to claim 3, wherein a shell is arranged to seal outside of the surface acoustic wave sensor, the pins extend out from the shell.

5. The patch-type passive surface acoustic wave sensing device according to claim 1, wherein the diameter of the first central hole and the diameter of the second central hole are larger than the outer diameter of the surface acoustic wave sensor.

6. The patch-type passive surface acoustic wave sensing device according to claim 5, wherein the gap between the inner wall of the first central hole and the surface acoustic wave sensor, and the inner wall of the second central hole and the surface acoustic wave sensor is not less than 0.1 cm.

7. The patch-type passive surface acoustic wave sensing device according to claim 1, wherein the first rubber sheet, the second rubber sheet, the third rubber sheet and the passive surface acoustic wave sensing device arranged in are put in a mold to shape by vulcanization.

8. The patch-type passive surface acoustic wave sensing device according to claim 1, wherein two pins are provided and the antenna connected with the pin is a spring antenna or a steel wire dipole antenna.

9. An intelligent tire, comprising a patch-type passive surface acoustic wave sensing device according to claim 1, the patch-type passive surface acoustic wave sensing device is fixedly arranged on the inner wall of the tire.

10. The intelligent tire according to the claim 9, wherein the patch-type passive surface acoustic wave sensing device is fixed to the tire with cold vulcanization glue.

* * * * *